United States Patent [19]

Obara et al.

[11] Patent Number: 4,638,140
[45] Date of Patent: Jan. 20, 1987

[54] APPARATUS FOR GUIDING A WIRE ELECTRODE OF A WIRE ELECTRODE DISCHARGE MACHINE

[75] Inventors: Haruki Obara, Sagamihara; Toshiyuki Aso, Hino, both of Japan

[73] Assignee: Fanuc Ltd, Minamitsuru, Japan

[21] Appl. No.: 700,886

[22] PCT Filed: Jun. 12, 1984

[86] PCT No.: PCT/JP84/00303
§ 371 Date: Jan. 28, 1985
§ 102(e) Date: Jan. 28, 1985

[87] PCT Pub. No.: WO85/00025
PCT Pub. Date: Jan. 3, 1985

[30] Foreign Application Priority Data

Jun. 14, 1983 [JP] Japan .................... 58-104926

[51] Int. Cl.⁴ .................... B23H 1/00; B23H 7/10
[52] U.S. Cl. .................... 219/69 W; 204/206; 219/69 D
[58] Field of Search .............. 219/69 W, 69 D, 69 E; 204/206; 76/107 R; 72/465

[56] References Cited

U.S. PATENT DOCUMENTS

| | | | |
|---|---|---|---|
| 3,928,163 | 12/1975 | Ullmann et al. | 219/69 W |
| 4,123,645 | 10/1978 | Shichida et al. | 219/69 W |
| 4,250,371 | 2/1981 | Haug et al. | 219/69 W |
| 4,495,393 | 1/1985 | Janicke | 219/69 W |
| 4,539,459 | 9/1985 | Yamagata | 219/69 D |

FOREIGN PATENT DOCUMENTS

| | | | |
|---|---|---|---|
| 52-20498 | 2/1977 | Japan | 219/69 W |
| 55-48525 | 4/1980 | Japan | 219/69 W |
| 157430 | 12/1980 | Japan | 219/69 W |
| 114628 | 9/1981 | Japan | 219/69 W |
| 186534 | 10/1983 | Japan | 219/69 W |

*Primary Examiner*—A. D. Pellinen
*Assistant Examiner*—Geoffrey S. Evans
*Attorney, Agent, or Firm*—Staas & Halsey

[57] ABSTRACT

A wire guide consisting of a V-groove-type guide, a device for supplying machining liquid, and a die-type wire guide removably attached at the lower surface of the V-groove-type guide causes increased machining accuracy while used in both non-taper machining and taper machining modes. The increased accuracy is achieved after the wire passes through the V-groove-type guide by using the die-type wire guide to return the wire to a straight path to improve the linearity of the wire and, accordingly, improve machining accuracy.

1 Claim, 9 Drawing Figures

FIG. 1 PRIOR ART
FIG. 2 PRIOR ART
FIG. 3 PRIOR ART
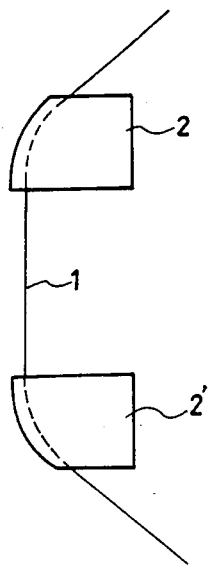
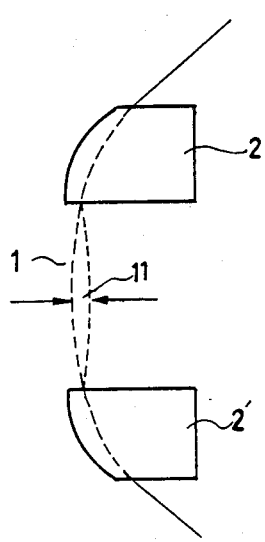
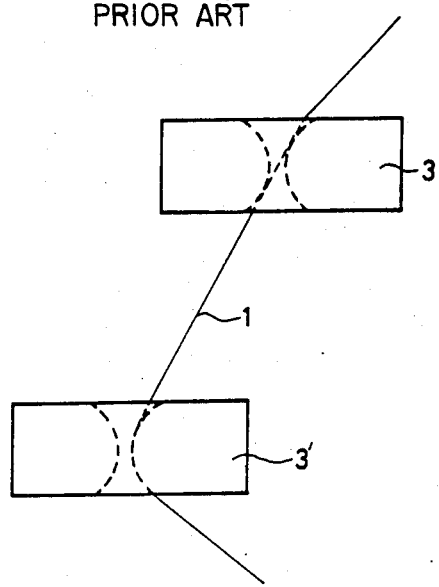
FIG. 4
FIG. 5 PRIOR ART
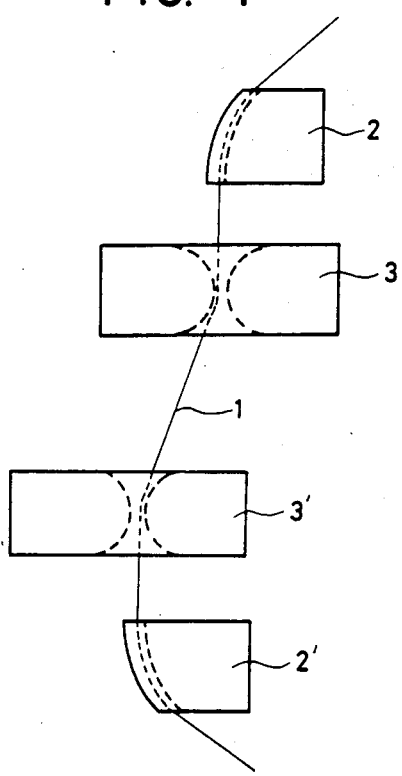
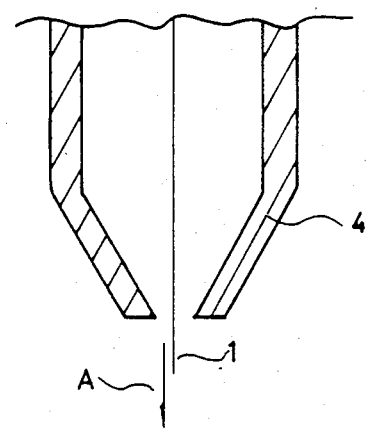

APPARATUS FOR GUIDING A WIRE ELECTRODE OF A WIRE ELECTRODE DISCHARGE MACHINE

FIELD OF THE INVENTION

This invention relates to an improvement applicable to an apparatus for guiding a wire electrode of a wire electrode discharge machine (hereinafter referred to as a wire EDM). More specifically, this invention relates to an improved apparatus for guiding a wire electrode of a wire EDM, which is suitable for employment in the ordinary machining mode (non-taper machining mode) and which is suitable for employment in the taper machining mode while allowing a wire EDM to realize improved quality of machining accuracy.

BACKGROUND OF THE INVENTION

A wire EDM is defined as equipment for machining a work made of a conductive material, particularly of metal, based on the machining process, wherein: (a) an intermittent electric spark discharge is generated in a machining liquid ejected into a gap between a workpiece of a conductive material, e.g., a metal and a wire electrode of a conductive material, e.g., brass, the wire electrode being extended under tension to penetrate the work; (b) the intermittent electric spark discharge causes an extremely small region of the workpiece adjacent to the aforementioned gap (hereinafter referred to as a machining region), to be softened and/or melted; (c) the intermittent electric spark discharge incidentally causes the internal pressure of the machining region to fluctuate; and (d) the fluctuated internal pressure causes the softened and/or melted region of the conductive material, e.g., a metal, to be disintegrated into a number of small particles and removed from the workpiece.

The aforementioned wire EDM is provided with a numerical control (NC) system, or the like, to accurately regulate, with an accuracy level of 0.001 mm, the geometrical position of the workpiece relative to the supporting point of the wire electrode which has an approximate diameter of 0.03–0.4 mm, thereby accurately regulating the geometrical position of the intermittent electric spark discharge (which is identical to the location of the wire electrode in the vicinity of an electrical discharge machining plane which is defined as a plane along which electric discharge machining occurs along the wire electrode), and maintaining the gap between the wire electrode and the electrical discharge machining plane at approximately 0.03 mm. The wire EDM is further provided with a means for stabilizing the intermittent electric spark discharge. A combination of these means is effective to accurately regulate the geometrical position of the electrical discharge machining plane, resultantly realizing an excellent grade quality of machining accuracy.

Parameters allowed for regulating the wire EDM are limited to two items, including the geometrical position of the supporting point of a wire electrode with respect to a work and the aforementioned intermittent electric spark discharge. Therefore, it is essential for the wire EDM to extend the wire electrode without a sag and to maintain the gap between the wire electrode and the electrical discharge machining plane at a constant value, because it is otherwise impossible for the wire EDM to accurately regulate the geometrical position of the electrical discharge machining plane by regulating the aforementioned two parameters. Accordingly, the machining accuracy of a wire EDM greatly depends on the linearity of the wire electrode and the accuracy of the electrical discharge gap.

Thus, various efforts are being used to improve the linearity of the wire electrode and to stabilize the intermittent electric discharge to maintain the electric discharge gap at an accurately constant value.

Firstly, a V-groove-type wire guide is available in the prior art to improve the linearity of the wire electrode. As is illustrated in FIG. 1, a wire electrode 1 is extended under tension between a pair of V-groove type wire guides 2, 2', which are driven in a plane perpendicular to the wire electrode 1 by a servo mechanism. This V-groove type wire guide advantageously allows easy setting of the wire electrode and does not require any particular attention to be paid to irregularity in the diameter of wire electrode, e.g., the irregularity caused by projections, or the like, produced on the surface of the wire electrode caused by electric discharge. Incidentally, however, since the wire electrode has an approximate diameter of 0.03–0.4 mm, a large amount of tension cannot be applied thereto. In addition, a wire is hard and is inclined to stay in a bent or kinked shape, once it is bent. Due to these parameters, it is not easy to realize a satisfactory quality of linearity with a V-groove-type wire guide. In other words, there is a tendency for the deviation shown by 11 in FIG. 2 to occur. In addition, the value of this deviation is unstable or changeable and often appears with vibration.

Secondly, a wire EDM can be employed in two independent machining modes. The first is an ordinary machining mode or a non-taper machining mode in which a wire electrode is maintained in a direction perpendicular to the direction in which the wire electrode is moved with respect to the workpiece. The second one is a taper machining mode in which a wire electrode can be inclined against the plane in which the wire electrode is moved. In this taper machining mode, a V-groove-type wire guide cannot be employed due to the following reasons.

The first reason is that, since the taper machining causes each of the upper and lower guides to be driven independently of the other in the plane perpendicular to the wire electrode, the supporting point of the wire slides along the V-groove of the V-groove type-wire guide. This leaves the supporting position of wire electrode in an unstable position. This means that the supporting point is not maintained at a fixed point, readily resulting in lesser quality of machining accuracy.

The second reason is that a V-groove-type wire guide imposes a limitation on the direction in which the wire electrode is inclined. In other words, a wire electrode is not allowed to be inclined in arbitrary directions.

Accordingly, a pair of die-type wire guides 3, 3' illustrated in FIG. 3 is employed in the taper machining mode. Since a die-type wire guide imposes no limitation regarding the direction in which the wire electrode is allowed to be inclined, this wire guide can be employed in the taper machining mode. It is supposed that a die-type wire guide having a sufficiently small die diameter can maintain the distance between the supporting points of the upper and lower guides at a constant value, and that the geometrical position of the wire electrode can accurately be regulated in the region close to the electrical discharge machining plane by regulating the supporting points of the wire electrode, even if one of the upper and lower wire guides is driven independently of the other. In reality, however, a margin is required for the die diameter, for the purpose of setting a wire electrode to a wire EDM, and irregularity in the diameter caused by electric discharge must be taken into consideration.

Due to these parameters, the accuracy in regulating the position of the wire electrode with respect to the workpiece is worse for the die-type wire guides than for the V-groove-type wire guides. Although the die type wire guide supports a wire at only one supporting point, the wire is not allowed to be bent with a sharp angle. This could be a reason for the poor accuracy of positioning the wire. A combination of these parameters causes an unsatisfactory quality of machining accuracy.

Thirdly, an apparatus for guiding a wire electrode provided with a combination of a pair of V-groove-type wire guides 2,2' and a pair of die-type wire guides 3, 3' which is illustrated in FIG. 4, was developed by the present inventors for the purpose of removing the foregoing drawbacks, and a patent application was filed in the Japanese Patent Office by FANUC LTD on Apr. 27, 1982 (Toku Gan Show No. 57-70973). It was experimentally demonstrated that this apparatus could realize a high quality of machining accuracy in the taper machining mode, because it is effective in straightening the wire electrode and that this apparatus could realize a high quality of accuracy also in the non-taper machining mode. Incidentally, however, the problem remained unsolved regarding how best to assemble the various components of the apparatus into one convenient practical unit.

Fourthly, for the purpose of maintaining an intermittent electric spark discharge in a stable manner, the wire electrode is required to be surrounded by a film of a machining liquid. To satisfy this requirement, a nozzle which is illustrated by 4 in FIG. 5 and which has an approximate nozzle diameter range of 3-6 mm, is employed to allow the wire electrode to penetrate it and to allow the machining liquid to flow in the direction shown in arrow A and in the shape of a liquid column surrounding the wire electrode.

FIGS. 6 and 7 illustrate two independent types of apparatuses for guiding a wire electrode of a wire EDM available in the prior art under the aforementioned technical environments.

FIG. 6 illustrates an apparatus for guiding a wire electrode of a wire EDM provided with a supporting plate 5 and a functional member 6 which is fixed at the lower surface of the supporting plate 5 and which is provided with a V-groove-type wire guide 2 and a machining liquid nozzle 4'. This apparatus is not suitable to be employed in the taper machining mode but is suitable to be employed in the ordinary or non-taper machining mode.

In contrast, FIG. 7 illustrates an apparatus for guiding a wire guide of a wire EDM provided with a supporting plate 5 and a functional member 7 which is fixed at the lower surface of the supporting plate 5 and which is provided with a die-type wire guide 3 and a machining liquid nozzzle 4". This is suitable to be employed in the taper machining mode.

The above description indicates that apparatuses for guiding a wire electrode of a wire EDM available in the prior art are limited to either one which comprises a V-groove-type wire guide and is preferably employed in the non-taper machining mode or one which comprises a die-type wire guide and is employed in the taper and non-taper machining modes. This means that an apparatus for guiding a wire electrode of a wire EDM which is adaptable for use with a device having a V-groove-type wire guide and a die-type wire guide and a device using a V-groove-type wire guide alone, is not available in the prior art.

SUMMARY OF THE INVENTION

The first object of this invention is to provide an apparatus for guiding a wire electrode of a wire EDM having a variety of advantages itemized below:

It can realize an excellent quality of linearity of a wire electrode, resultantly improving the machining accuracy for a wire EDM to which this apparatus for guiding a wire electrode of a wire EDM is employed;

It can be employed both in the taper machining mode and in the non-taper machining mode;

It is easy to manipulate; and

It can be readily converted to an apparatus for guiding a wire electrode which is preferably employed in the non-taper machining mode.

The second object of this invention is to provide an equipment for guiding a wire electrode of a wire EDM having a variety of advantages itemized below:

It can realize an excellent quality of linearity of a wire electrode, resultantly improving the machining accuracy for a wire EDM to which this equipment for guiding a wire electrode of a wire EDM is employed;

It is preferably employed in the non-taper machining mode;

It is easy to maniplate; and

It is readily converted to an apparatus for guiding a wire electrode which is employed both in the taper machining mode and in the non-taper machining mode.

To achieve the foregoing first object of this invention, an apparatus for guiding a wire electrode of a wire EDM in accordance with this invention is provided with:

(a) a V-groove-type guide unit in which a V-groove-type wire guide and a means for supplying a machining liquid are assembled; and (b) a die-type wire guide unit which is removably attached at the lower surface of the V-groove-type guide unit and in which a die-type wire guide and a machining liquid nozzle are assembled, the machining liquid nozzle being connected to the machining liquid supply means and having a liquid channel surrounding the die-type wire guide.

To achieve the foregoing second object of this invention, an apparatus for guiding a wire electrode of a wire EDM in accordance with this invention is provided with:

(a) a V-groove-type guide unit in which a V-groove-type wire guide which guides a wire electrode and a means for supplying a machining liquid are assembled; and (b) a nozzle means which is removably attached at the lower surface of the V-groove-type guide unit and which is further provided with a longitudinal hollow space which is connected to the machining liquid supply means and which is branched toward the V-groove of the V-groove-type guide.

BRIEF DESCRIPTION OF THE DRAWINGS

A detailed description will be presented below for apparatus for guiding a wire electrode of a wire EDM in accordance with two embodiments of this invention, referring to the drawings itemized below.

FIG. 1 is the schematic view of conventional a pair of V-groove-type wire guides.

FIG. 2 is the schematic view illustrating the deviation occurring with use of the pair of V-groove-type wire guides. Shown in FIG. 1

FIG. 3 is the schematic view of a pair of conventional die-type wire guides.

FIG. 4 is the schematic view of a conventional apparatus for guiding a wire electrode consisting of a pair of V-groove-type wire guides and a pair of die-type wire guides.

FIG. 5 is the schematic view of a conventional nozzle for ejecting a machining liquid.

DETAILED DESCRIPTION OF THE PREFERRED EMBODIMENTS

Figure 6:
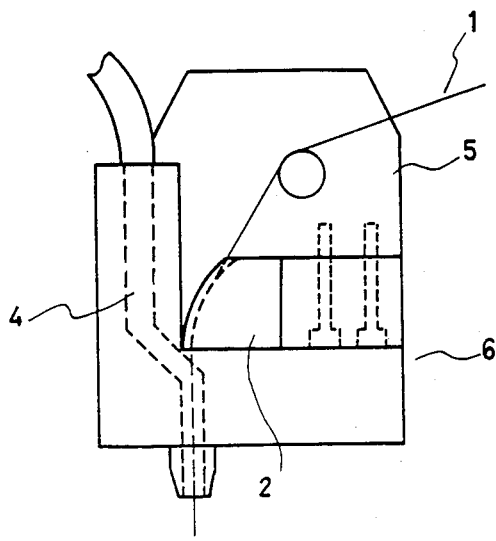
FIG. 6 is the schematic view of an apparatus for guiding a wire electrode having a V-groove-type wire guide and a nozzle for ejecting a machining liquid available in the prior art.
Figure 7:
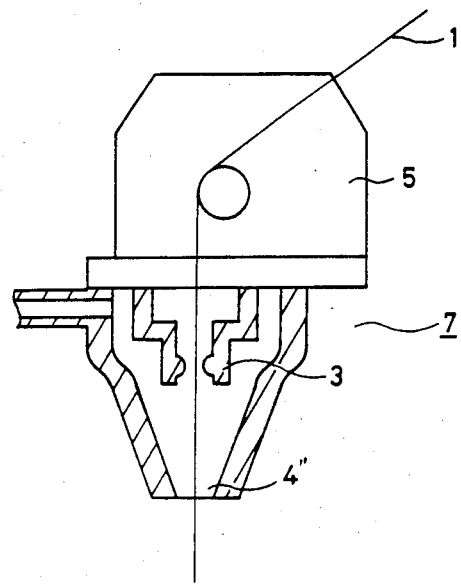
FIG. 7 is the schematic view of an apparatus for guiding a wire electrode having a die-type wire guide and a nozzle for ejecting a machining liquid available in the prior art.
Figure 8:
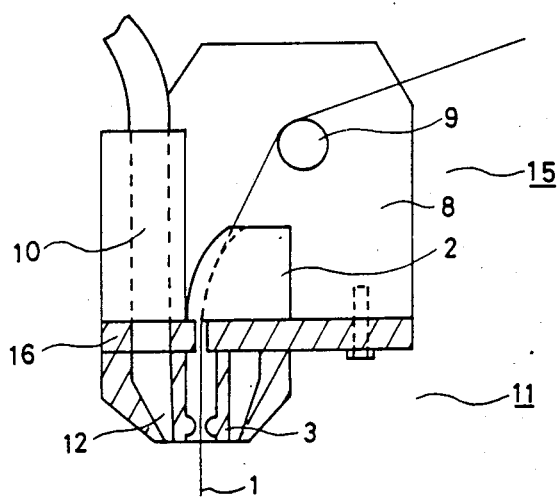
FIG. 8 is the schematic view of an apparatus for guiding a wire electrode of a wire EDM in accordance with the first embodiment of this invention.

FIG. 8 illustrates an apparatus for guiding a wire electrode of a wire EDM in accordance with the first embodiment of this invention, which is provided with both a V-groove-type wire guide 2 and a die-type wire guide 3, and which can be employed not only in the ordinary machining mode or the non-taper machining mode but also in the taper machining mode with an excellent quality of machining accuracy in both of the above-mentioned machining modes.

Referring to FIG. 8, a V-groove-type guide unit 15 is provided with a V-groove-type wire guide 2, a wire feeder means 9, e.g. a wire feeder roller, and the like, and a machining liquid supply means 10, all of which are assembled on a supporting member 8. A die-type guide unit 11 is provided with a die-type wire guide 3 and a machining liquid nozzle 12 which has a machining liquid channel which is connected to the above-mentioned machining liquid supply means 10 and surrounds the die-type wire guide 3, all of which are assembled on an assembling member 16, which is removably attached to the the lower surface of the supporting member 8 of the above-mentioned V-groove-type guide unit 15.

Since the above-mentioned equipment for guiding a wire electrode of a wire EDM is provided with both the V-groove-type wire guide 2 and the die-type wire guide 3, it can be employed also in the taper machining mode, and it can realize a better quality of machining accuracy in either machining mode, because it can remove the wire kink and improve the linearity of the wire electrode. In other words, the wire electrode 1 fed to the aforementioned apparatus for guiding a wire electrode of a wire EDM is straightened in the the V-groove-type wire guide 2 which has a strong ability to cause plastic deformation for a wire in one direction, before it is led into the die-type wire guide 3 which has a relatively weak ability to cause plastic deformartion for a wire. As a result, the linearity is remarkably improved for the wire electrode which has passed through the aforementioned apparatus for guiding a wire electrode of a wire EDM. This result has been experimentally demonstrated. In addition, since the die-type guide unit 11 is removably attached to the V-groove type guide unit 15, it can readily be converted to an apparatus for guiding a wire electrode of a wire EDM in accordance with the second embodiment of this invention. Accordingly, this apparatus for guiding a wire electrode of a wire EDM is easy to manipulate. This is a considerable advantage from the practical viewpoints, because cases may arise where the convenience in manipulation is preferable to the excellence in the machining accuracy.

Figure 9:
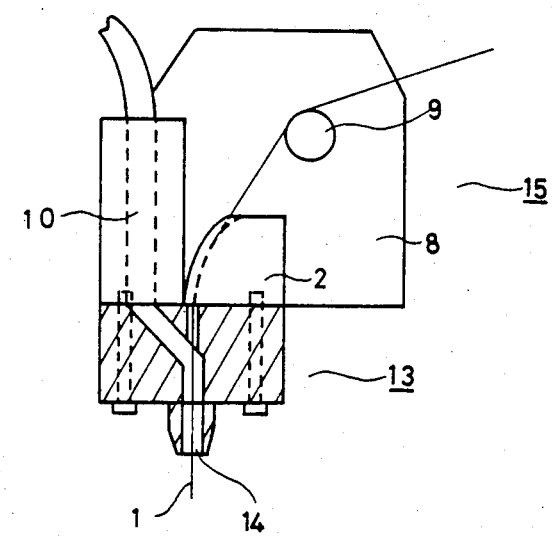
FIG. 9 is the schematic view of an apparatus for guiding a wire electrode of a wire EDM in accordance with the second embodiment of this invention.

FIG. 9 illustrates an apparatus for guiding a wire electrode of a wire EDM in accordance with the second embodiment of this invention, which is provided with a V-groove-type wire guide 2 alone. This apparatus is preferably employed in cases where the convenience in manipulation is preferable to the excellence in machining accuracy.

Referring to FIG. 9, a nozzle means 13 is provided with a longitudinal hollow space 14 which is connected to the machining liquid supply means 10 and which is branched toward the V-groove of the V-groove-type guide 2, because it has a combined function to allow the wire electrode 1 to pass through the longitudinal hollow space 14 and as a nozzle for ejecting the machining liquid toward the machining region. The nozzle means 13 is removably attached to the lower surface of the V-groove-type guide unit 15. Since the above-mentioned apparatus for guiding a wire electrode of a wire EDM is provided with the V-groove-type wire guide 2 alone, it is not necessarily suitable to be employed in the taper machining mode. Incidentally, since it cannot realize as good a linearity as can be realized with the apparatus for guiding a wire electrode of a wire EDM in accordance with the first embodiment of this invention, it cannot realize as excellent quality in the machining accuracy as can be realized with the apparatus for guiding a wire electrode of a wire EDM in accordance with the first embodiment of this invention, in the non-taper machining mode either. However, this embodiment involves convenience in manipulation e.g., convenience in setting the wire electrode therein. Therefore, it realizes a considerable quality of practical advantage regarding the manipulation thereof. Further, since the nozzle means 13 is removable, it can be readily be converted to an apparatus for guiding a wire electrode of a wire EDM in accordance with the first embodiment of this invention.

The foregoing description has clarified that an apparatus for guiding a wire electrode of a wire EDM achieved by this invention involves the following advantages, including: (1) the apparatus for guiding a wire electrode of a wire EDM is readily convertible between a device which is provided with the V-groove-type wire guide alone and another which is provided with both the V-groove-type wire guide and the die-type wire guide; (2) an excellent quality of convenience in manipulation can be enjoyed with the former configuration; (3) taper machining can be conducted with the latter configuration; and (4) an excellent quality of machining accuracy can be enjoyed with either of the two configurations due to an excellent quality of linearity which can be realized for the wire electrode.

Although the foregoing description which referred to the drawings shows the wire electrode directed downward, this apparatus for guiding a wire electrode of a wire EDM can be employed for the cases in which the wire electrode proceeds upward or the apparatus is installed on the lower wire guide.

Further, any selection is entirely free for: (1) employment of a pair of the apparatuses for guiding a wire electrode, each of which is provided with both the V groove-type wire guide and the die-type wire guide; and (2) employment of a combination of the apparatus which is provided with both the V-groove-type type wire guide and the die-type wire guide and the equipment which is provided with the V-groove-type wire guide alone.

Although the foregoing description was presented referring to specific embodiments, this is not meant to be construed in a limiting sense. Various modifications of the disclosed embodiments, as well as other embodiments of this invention, will be apparent to persons skilled in the art upon reference to the description of this invention. It is, therefore, contemplated that the appended claims will cover any such modifications or embodiments as fall within the true scope of this invention.

What is claimed is:

1. An apparatus for guiding a wire electrode of a wire electrode discharge machine, comprising:
   (a) a V-groove-type guide unit, including a V-groove-type wire guide and means for supplying a machining liquid; and
   (b) a die-type wire guide unit removably attached at the lower surface of said V-groove-type guide unit, said die-type wire guide unit including a die-type wire guide and a machining liquid nozzle, and said machining liquid nozzle being connected to said machining liquid supply means and having a liquid channel surrounding said die-type wire guide.

* * * * *